Patented Nov. 7, 1950

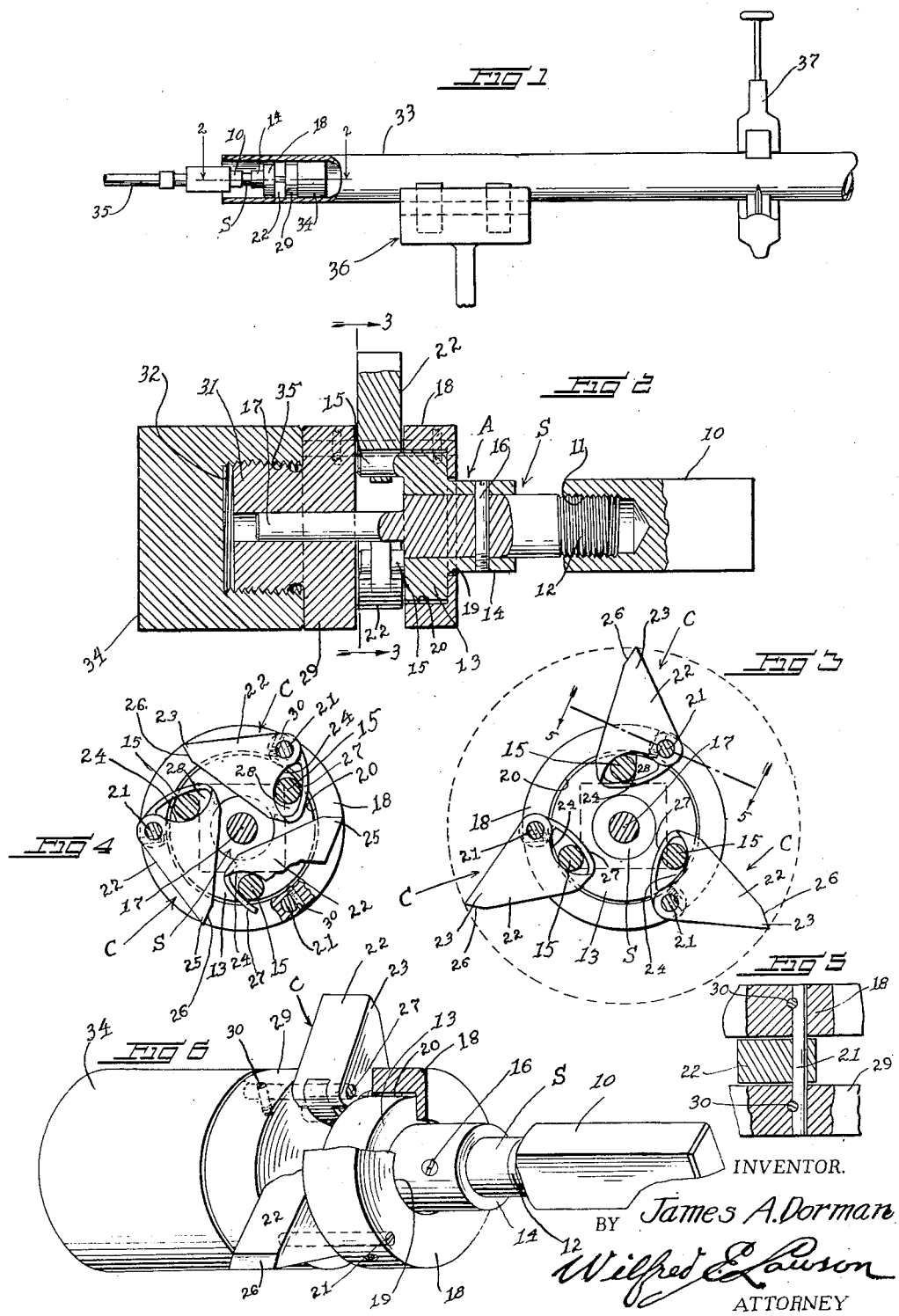

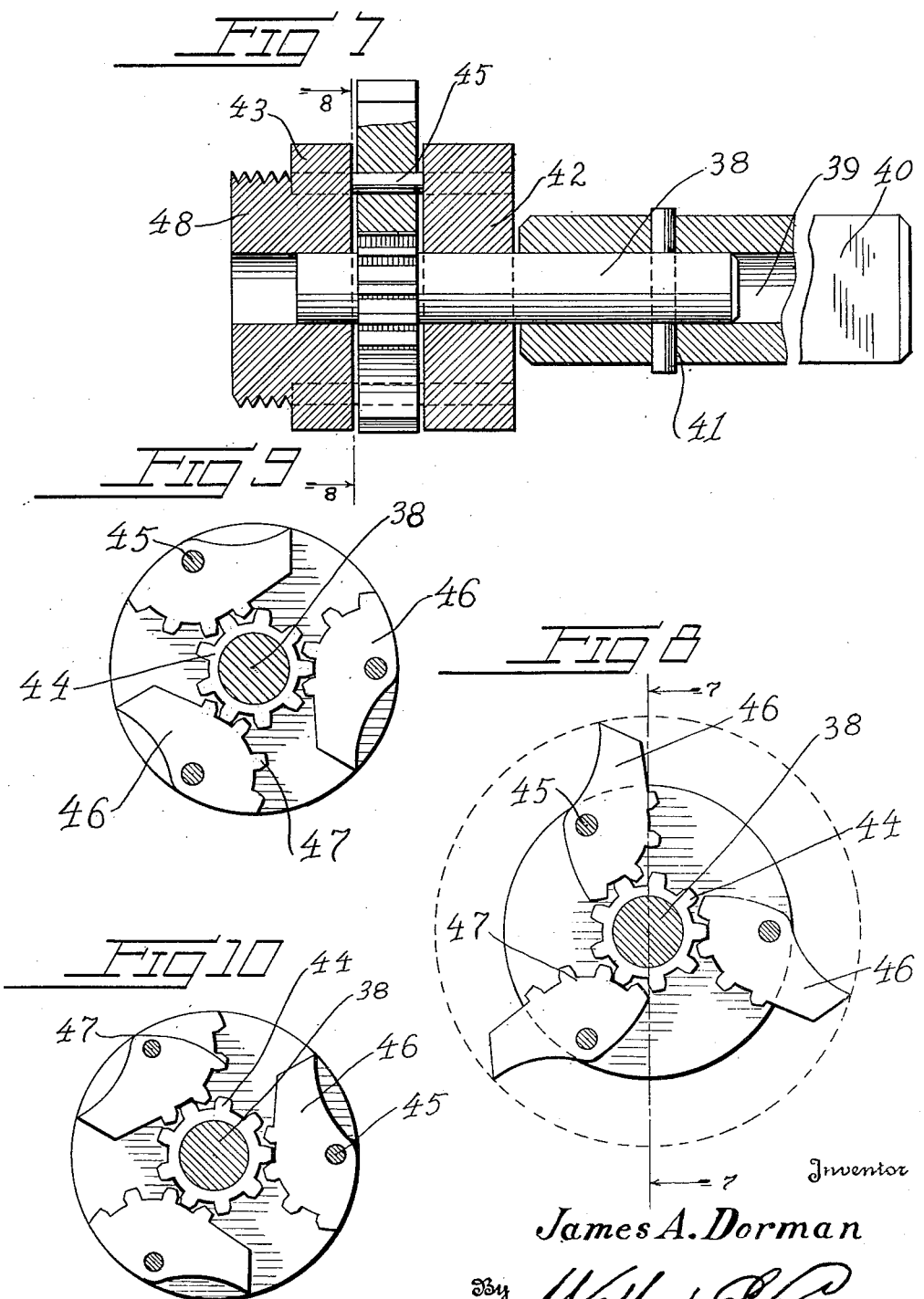

2,528,873

UNITED STATES PATENT OFFICE 2,528,873

PIPE CHUCK

James A. Dorman, Elsie, Mich.

Application April 29, 1949, Serial No. 90,381

7 Claims. (Cl. 279—33)

The invention relates to chucks and more particularly to pipe chucks adapted to be removably connected to a driving shaft.

The primary object of the invention is to provide a pipe chuck of the character indicated above adapted to be inserted into a pipe and equipped with a plurality of normally retracted clamping cams and means for pivoting said cams outwardly into clamping position upon rotation of the chuck in one direction and for returning them into retracted position upon rotation of the chuck in the opposite direction.

Another object of the invention is to eliminate the laborious time and money consuming process of cutting pipes and tubings by hand.

A further object of the invention is to eliminate the necessity of using additional tools such as a wrench or the like for the purpose of adjusting the chuck in working position.

The invention consists in the details of construction and in the combination and arrangement of the several parts of my improved pipe chuck whereby certain advantages are attained, as will be hereinafter more fully set forth.

In order that my invention may be better understood, I will now proceed to describe the same with reference to the accompanying drawings, wherein:

Figure 1 is a view in elevation of an internal pipe chuck in accordance with the present invention shown in working position inside of a pipe and attached to a driving shaft, a part of the pipe being broken away;

Figure 2 is a view in section taken on the line 2—2 in Figure 1;

Figure 3 is a view in section taken on the line 3—3 in Figure 2;

Figure 4 is a view similar to Figure 3, the clamping dogs being shown in retracted position;

Figure 5 is a view in section taken on the line 5—5 in Figure 3;

Figure 6 is a view in perspective of an assembled internal pipe chuck in accordance with the present invention, the clamping dogs being shown in projected or working position and a portion of the rear dog support being broken away;

Figure 7 is a sectional view with parts in elevation illustrating another embodiment of the invention, the section being substantially on the line 7—7 of Figure 8;

Figure 8 is a sectional view taken substantially on the line 8—8 of Figure 7;

Figure 9 is a view similar to Figure 8 with the clamping dogs retracted; and

Figure 10 is a view similar to Figure 9 but showing the clamping dogs in a reverse arrangement.

The pipe chuck embodied herein comprises an elongated square shank 10 provided in one of its end portions hereinafter called the front end portion, with an axially extended tapped hole 11. The rear end portion of a stem S is threaded as at 12 and is adapted to be threadedly mounted on the shank 10. An actuator A comprises an annular body 13 on the rear surface of which a tubular flange 14 is formed. The flange is arranged coaxially with the body. The inside diameter of the flange 14 is of the same length as the inside diameter of the annular body 13, but the outside diameter of the flange is smaller than the outside diameter of the body. A plurality of cylindrical fingers 15, preferably three, are formed equidistantly from each other on the front surface of the body 13. The actuator A fits snugly on the stem S and is secured thereto intermediate the ends thereof by means of a screw 16 extending through the flange 14 and the stem S. The stem portion 17 projecting forwardly beyond the body 13 is of reduced diameter.

A rear dog support 18 has a bore 19 and a counterbore 20 and is adapted to receive the annular body 13 of the actuator A in the counterbore 20 and to permit the tubular flange 14 of said actuator to extend rearwardly through the bore 19 so that the fingers 15 project forwardly beyond the forward end surface of the rear cam support.

A plurality of pins 21 are set into the rear dog support 18 and are spaced equidistantly from each other. The number of pins 21 is equal to the number of actuator fingers 15 and said pins project forwardly from the rear cam support.

On each pin 21 a clamping dog C is pivotally mounted. Each clamping dog comprises an approximately triangular body 22 having an acute apex angle 23. The edge opposite of the apex angle is curved concavely to form a cam face 24 and a hole 25 is provided adjacent to the junction of the cam face and one of the other edges of the body 22 hereinafter called the rear edge. The hole 25 is adapted to receive a pin 21 so that the dog C is pivotally mounted on said pin. The portion of the third edge of the triangular body 22 located next to the apex is bevelled as at 26. The two corners on the ends of the cam face 24 are connected with each other by means of a metal strip 27 formed on or secured to the body 22. The strip surface opposite to the cam face 24 is concaved and forms with said face an elongated opening 28 into which one of the actuator fingers 15 projects.

The pins 21 extend forwardly beyond the clamp dogs C mounted thereon and the front end portions of said pins are set into a front dog support 29. Set screws 30 extending radially into the rear cam support 18 and the front dog support 29 engage the pins 21 and secure the two supports in position in relation to each other and to the clamping dogs C mounted on said pins.

A screw plug 31 is formed centrally on the front surface of the front dog support 29 and is provided with an outside thread. A central bore 32 extends axially through the front dog support 29 and the screw plug 31 and the reduced front end portion 17 of the stem S fits rotatably into said bore.

When a pipe 33 is to be cut a guide head 34 having an outside diameter to fit slidably in the pipe and provided with an internal thread 35, is screwed onto the screw plug 31. The clamp dogs C are arranged in retracted position between the front and rear support 18 and 29 respectively by turning the shank 10 and the stem S so that the fingers 15 of the actuator A secured to the stem S are moved in clockwise direction from their position shown in Figure 3 into the position shown in Figure 4. The fingers engage the cam faces 24 pivoting the clamping dogs C about the pins 21 into the desired position. The shank 10 is connected by means of a universal drive shaft 35 or the like, to a source of power. The chuck is inserted in the pipe 33 and the drive shaft 35 is started driving the shank 10. The fingers 15 engage the cam faces 24 and pivot the clamp dogs C about the pins 21 so that the apexes 23 of said dogs project beyond the circumferential rims of the cam supports 18 and 29 and engage the wall of the pipe 33, which rests on a roller support 36 of any preferred conventional make and construction. A pipe cutter 37 of conventional construction is attached to the pipe on the place where it is to be cut and the rotation of the shank 10 is transmitted by the fingers 15 to the pipe 33, so that the labor of manipulating the pipe cutter 37 is reduced to the simple actions of holding it in place and tightening it on the pipe.

When the pipe 33 is cut, the drive shaft 35 is reversed and the shank 10 and the actuator A are rotated so that the fingers 15 engage the inner surfaces of the strips 27 and pivot the clamp dogs C into retracted position.

In the embodiment of the invention as illustrated in Figures 7 to 10, one end portion of the stem 38 is snugly received in an axial bore 39 of the shank 40 for operative engagement with a drive member. The stem and shank are held in desired assembly by a removable pin 41.

Mounted on the opposite or outer end portion of the stem 38 are the supporting members or disks 42 and 43 and between which is positioned a pinion 44 surrounding the stem 38 and fixed thereto for rotation therewith.

Removably insertible through the peripheral portions of the members or disks 42 and 43 and bridging the space therebetween outwardly of the pinion 44 are the pins 45. The pins 45 are herein disclosed as three in number equidistantly spaced around the members or disks 42 and 43 and also equidistantly spaced from the axial centers of said members or disks.

Freely mounted on the pins 45 are the clamping dogs or jaws 46 of desired configuration and dimensions. Each of these jaws 46 has an inner marginal portion formed, as at 47, to provide an arcuate rack substantially concentric to the associated mounting pin 45 and which rack is constantly in mesh with the pinion 44.

Upon turning movement of the stem 38 in one direction, the dogs or jaws 46 will be fully retracted between the members or disks 42 and 43 and upon reverse rotation of the stem 38, said dogs or jaws 46 will be extended, as in Figure 8, for desired engagement with the internal wall of a pipe or other tubular members.

In Figures 8 and 9, the dogs or jaws 46 are extended upon clockwise rotation of the stem 38 but if for any reason it should be desired to have operation upon anti-clockwise rotation of the stem, the shank 40 can readily be removed from the stem 38 by withdrawal of the pin 41. After removal of the pin 41, the disks or members 42 and 43 can be readily separated sufficiently to allow the dogs or jaws 46 to be removed and reapplied in reverse position as illustrated in Figure 10.

The outer member or disk 43, is provided with an outwardly disposed hub 48 upon which is adapted to be threaded a guide head such as the head 34 of the first embodiment of the invention.

The above description shows clearly that a chuck constructed in accordance with the present invention can be secured in working position on a pipe and can be removed therefrom without using a wrench or any other tool and that time and labor spent on cutting a pipe is reduced to a minimum.

I claim:

1. A pipe chuck adapted to be connected with a driving shaft and to be inserted in a pipe including a plurality of clamping dogs and means for pivoting said dogs into pipe engaging clamping position upon rotation of the chuck in one direction and for retracting them into pipe releasing idle position upon rotation of the chuck in the opposite direction.

2. A pipe chuck adapted to be connected with a driving shaft and to be inserted in a pipe, comprising clamping dogs, a pair of dog supports, said dogs being pivotally supported by and between the dog supports to turn on axes paralleling the pipe, each dog having an outwardly swinging point to engage the interior of the pipe and means for engaging and actuating the dogs.

3. A pipe chuck adapted to be connected with a driving shaft and to be inserted in a pipe, comprising clamping dogs, a pair of dog supports, said dogs being pivotally supported by and between the dog supports, means for engaging and actuating the dogs, a stem, and said dog supports being rotatable about the stem and the dog engaging means being firmly secured to said stem.

4. A pipe chuck adapted to be inserted into a pipe including a shank adapted to be connected with a drive shaft, a stem connected with the shank, an actuator firmly secured to the stem, a rear dog support rotatably mounted on the actuator, a front dog support rotatably mounted on the stem and spaced from the rear dog support, a pin extending between the two dog supports, a dog pivotally mounted on said pin between the supports, and a finger extending forwardly from the actuator and adapted to engage and pivot the dog upon rotation of the shank.

5. A pipe chuck as set forth in claim 2, including a guide head removably mounted on the dog support first entering the pipe, said head having an overall diameter of only slightly less diameter than the inside diameter of the pipe.

6. A pipe chuck as set forth in claim 4, including a screw plug projecting forwardly from the front cam support and a guide head removably mounted on the screw plug and fitting slidably into the pipe.

7. A chuck of the class described, comprising a stem, disks mounted on the stem, a pinion secured on the stem between the disks, jaws pivoted between the disks for swinging movement outwardly beyond the peripheries of the disks, an arcuate rack carried by each jaw and meshing with the pinion for swinging the jaw upon rotation of the stem.

JAMES A. DORMAN.

REFERENCES CITED

The following references are of record in the file of this patent:

UNITED STATES PATENTS

| Number | Name | Date |
|---|---|---|
| 868,471 | Onbridge | Oct. 15, 1907 |
| 988,302 | Blomberg | Apr. 4, 1911 |
| 1,187,920 | Muller | June 20, 1916 |
| 1,756,773 | Wendt | Apr. 29, 1930 |
| 2,465,923 | Premo | Mar. 29, 1949 |

FOREIGN PATENTS

| Number | Country | Date |
|---|---|---|
| 540,609 | Great Britain | Oct. 23, 1941 |
| 690,501 | Germany | Apr. 4, 1940 |